United States Patent
Esserman et al.

(10) Patent No.: US 11,716,607 B2
(45) Date of Patent: Aug. 1, 2023

(54) MANAGING DATA TRAFFIC IN A SUBSCRIPTION-BASED NETWORK ACCESS SYSTEM

(71) Applicant: VIASAT, INC., Carlsbad, CA (US)

(72) Inventors: James N. Esserman, La Jolla, CA (US); Daniel M. Newman, Littleton, MA (US); Girish Chandran, Carlsbad, CA (US); Mark D. Dankberg, Encinitas, CA (US); Jae Won Chung, Lexington, MA (US)

(73) Assignee: VIASAT, INC., Carlsbad, CA (US)

( * ) Notice: Subject to any disclaimer, the term of this patent is extended or adjusted under 35 U.S.C. 154(b) by 50 days.

(21) Appl. No.: 17/529,088

(22) Filed: Nov. 17, 2021

(65) Prior Publication Data

US 2022/0182813 A1 Jun. 9, 2022

Related U.S. Application Data

(63) Continuation of application No. PCT/US2019/033838, filed on May 23, 2019.

(51) Int. Cl.
*H04W 72/04* (2023.01)
*H04W 8/18* (2009.01)

(52) U.S. Cl.
CPC .................... *H04W 8/186* (2013.01)

(58) Field of Classification Search
CPC .................. H04W 8/18; H04L 12/86
See application file for complete search history.

(56) References Cited

U.S. PATENT DOCUMENTS

| | | | |
|---|---|---|---|
| 10,645,191 B1* | 5/2020 | Mehta | H04L 67/10 |
| 2016/0072574 A1 | 3/2016 | Xu et al. | |
| 2017/0325221 A1* | 11/2017 | Jalali | H04W 16/28 |
| 2018/0276689 A1* | 9/2018 | Zhang | G06Q 30/0201 |

FOREIGN PATENT DOCUMENTS

WO 2010128391 A2 11/2010

OTHER PUBLICATIONS

International Search Report and Written Opinion for PCT/US2019/033838, dated Feb. 20, 2020, in 11 pages.

* cited by examiner

*Primary Examiner* — Michael T Vu
(74) *Attorney, Agent, or Firm* — Chang & Hale LLP

(57) ABSTRACT

Described herein are systems and methods that dynamically manage network traffic for individual subscribers based on past and current data usage rates. The disclosed systems and methods operate to control data traffic for a group of subscribers that share a common access network or that share a common access link to an access network. Prior to an individual subscriber reaching their data plan limit, the disclosed systems and methods track individual subscribers' past and current data rates and manage individual subscribers' current usage rates so that each subscriber's continually or periodically updating past usage rate stays within a provisioning rate for the group. This can improve user experience because rather than waiting until a subscriber has reached their plan data limit to impose strict data usage restrictions, the disclosed systems and methods use modest restrictions continuously or intermittently during the plan period.

26 Claims, 8 Drawing Sheets

MANAGING DATA TRAFFIC IN A SUBSCRIPTION-BASED NETWORK ACCESS SYSTEM

CROSS-REFERENCE TO RELATED APPLICATION

This application is a continuation of PCT App. No. PCT/US2019/033838 filed May 23, 2019 and entitled "MANAGING DATA TRAFFIC IN A SUBSCRIPTION-BASED NETWORK ACCESS SYSTEM," the entire contents of which is incorporated by reference herein for all purposes.

BACKGROUND

Field

The present disclosure relates to managing data traffic in a subscription-based network access system.

Description of Related Art

Network service providers can manage network traffic of its subscribers. Network management can include usage control and congestion management. Usage control includes keeping individual users within limits provided by their subscription plan. Congestion management includes selectively excluding, slowing, de-prioritizing, and/or delaying data traffic when the total demand on the network exceeds the total capacity of the network.

SUMMARY

In some embodiments, methods and/or systems manage data usage of a group of subscribers on a shared access network by receiving data usage feedback for the group of subscribers. As the data usage feedback is received, the feedback is used to update a past data usage rate for individual subscribers. The current data usage rate for individual subscribers is modified as needed so that a past data usage rate (e.g., as it is being updated) for an individual subscriber is brought within an enforcement rate that corresponds to a per-subscriber allocation of a capacity of the access network.

BRIEF DESCRIPTION OF THE DRAWINGS

Various embodiments are depicted in the accompanying drawings for illustrative purposes and should in no way be interpreted as limiting the scope of this disclosure. In addition, various features of different disclosed embodiments can be combined to form additional embodiments, which are part of this disclosure.

DETAILED DESCRIPTION OF SOME EMBODIMENTS

Figure 1A:
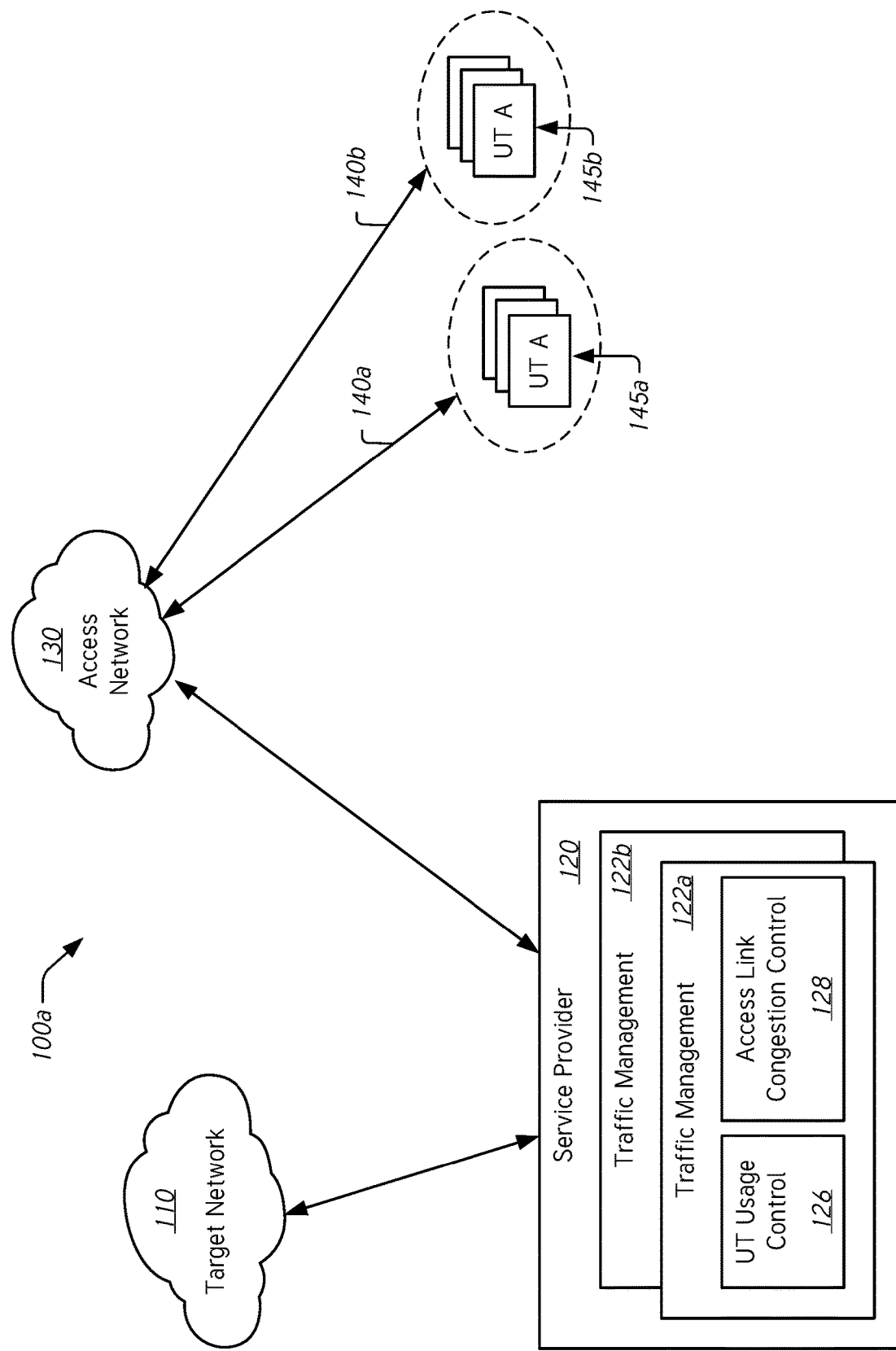
FIGS. 1A and 1B illustrate diagrams of example communications systems with a service provider that dynamically manages traffic to maintain users within provisioning limits.

The headings provided herein, if any, are for convenience only and do not necessarily affect the scope or meaning of the claimed invention.

Overview

To access a targeted network, such as the Internet, users typically subscribe to a service provider that provides an access network. A service provider can be, for example, an Internet service provider (ISP), and subscribers can be home- or business-subscribers to which the ISP provides access to the Internet. A typical subscription-based service requires a subscriber to pay a periodic or recurring fee for access to the access network during a particular period of time, referred to herein as a plan period. For example, a typical plan period is a month. The service provider allows a subscriber to download data from the target network at a data speed based on the current capacity of the access network (or an access link to the access network) and/or the subscription plan of the subscriber. The subscription also typically imposes a limit on the amount of data the subscriber can download and/or upload within a particular time period, referred to herein as a plan data limit. For example, a plan data limit may be about 200 GB per month.

It is not uncommon for some subscribers to utilize the access network more than others. In fact, overuse of the access network by some subscribers can result in unfairness and an unsatisfactory experience for other subscribers. For example, excess use of the access network by a few heavy-use subscribers can so dominate the resources of the access network that other subscribers do not receive fair access. To address this problem, some service providers identify subscribers who overuse the access network and impose limitations on their use of the access network. For example, when a subscriber reaches their plan data limit before the end of a plan period, the service provider may impose restrictions on that subscriber for the remainder of the plan period. Such restrictions may include drastically reducing the download rate until the end of the plan period. Although this can be effective in ensuring that other subscribers are not adversely affected, it can result in frustration and dissatisfaction to the restricted subscriber. This may be particularly burdensome if the restrictions are imposed days or weeks prior to the end of the plan period.

Accordingly, to address these and other issues, disclosed herein are systems and methods that dynamically manage network traffic for individual subscribers to reduce the likelihood that a subscriber reaches their plan data limit prior to the end of the plan period. For example, rather than waiting until a subscriber has reached their plan data limit to impose a restriction, the systems and methods disclosed herein use modest restrictions continuously, intermittently, periodically, or during targeted time periods (e.g., peak busy periods) of the plan period. These modest restrictions are based at least in part on current data usage of a subscriber relative historical (e.g. past) data usage of the subscriber and or current data usage of other subscribers. The disclosed systems and methods are configured to continuously or intermittently shape user traffic to create a relatively uniform user experience. The disclosed systems and methods continuously or intermittently shape data traffic so that an individual user does not exceed a targeted usage threshold (e.g., the subscriber's data plan limit) rather than imposing strict limitations once that threshold has been reached within a plan period. As used herein, restricting, shaping, controlling, or managing a current data usage rate of a subscriber are examples of "regulating" a current data usage rate for a subscriber. A peak busy time is an example of a "period" during a "first predetermined length of time." Historical data usage and a historical data usage rate are examples of "past data usage" and a "past data usage rate," respectively.

In some embodiments, the disclosed systems and methods operate to control data traffic for a group of subscribers that share a common access network or that share a common access link to an access network. Prior to an individual subscriber reaching their data plan limit, the disclosed systems and methods track individual subscribers' past and/or current data rates and manage individual subscribers' current usage rates so that the subscribers stay within a provisioning rate for the group of subscribers.

Advantageously, the disclosed systems and methods improve the subscriber experience relative to systems and methods that impose data speed restrictions only after a subscriber exceeds their plan data limit. The improved subscriber experience is due at least in part to the disclosed systems and methods imposing smaller or less noticeable restrictions throughout a plan period rather than imposing larger or noticeable restrictions at the latter part of a plan period. The disclosed systems and methods may also advantageously maintain users within a targeted provisioning rate rather than focusing on controlling traffic during periods of network congestion. This, in turn, may improve or optimize usage of network resources. Similarly, the disclosed systems and methods advantageously adapt to the subscriber usage distribution so that the mean usage over subscribers in a particular group (e.g., subscribers with the same subscriber plan sharing an access link to an access network) meet a targeted provisioning rate.

The description provided herein generally refers to communications systems that access a targeted network (e.g., the Internet) using an access network such as a satellite system. However, it is to be understood that the disclosed systems and methods can be used to manage usage of any communications channel that provides multiple users access to a shared resource.

Figure 1B:
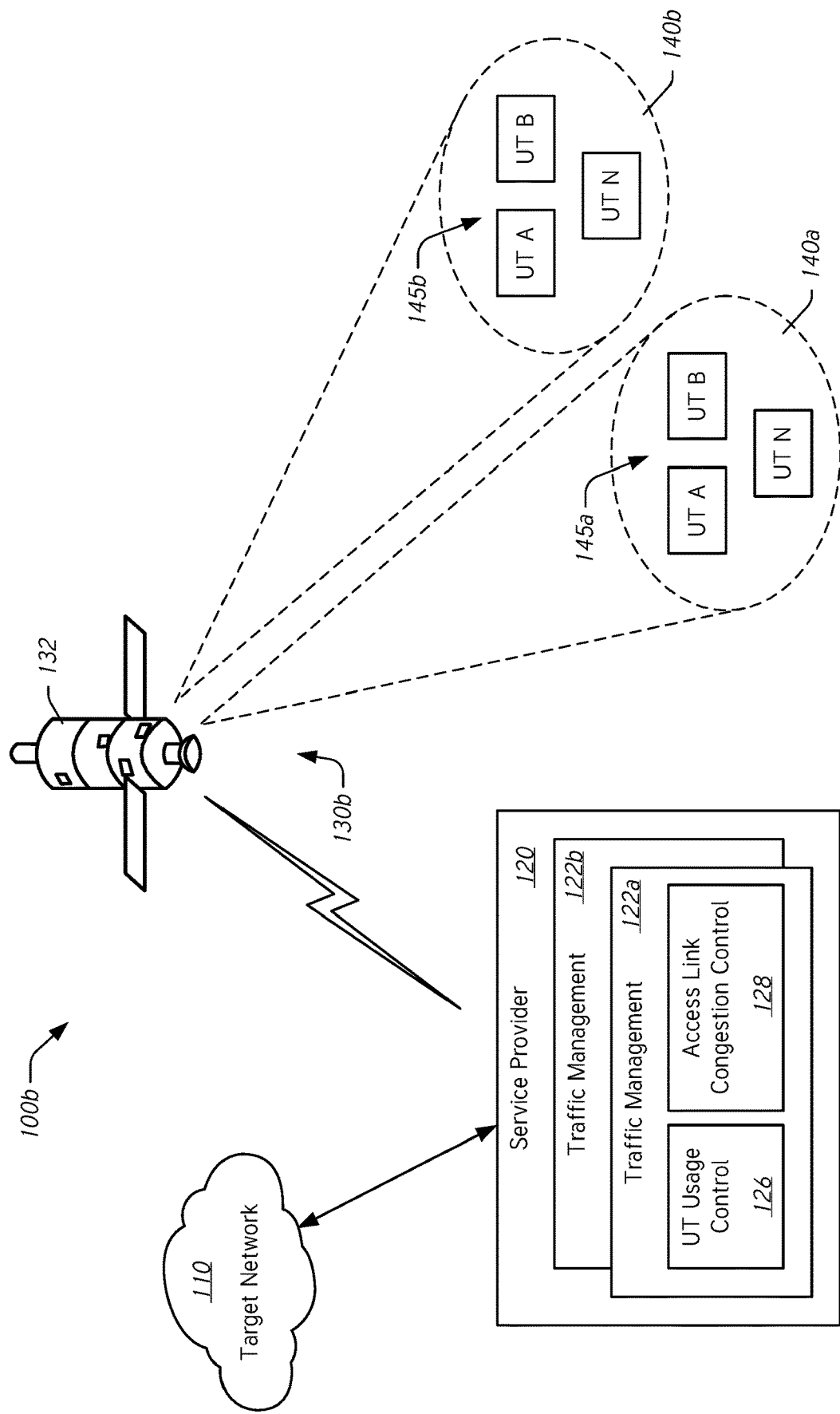

FIGS. 1A and 1B illustrate diagrams of example communication systems 100 with a service provider 120 that dynamically manages traffic to maintain subscribers within targeted data usage limits. FIG. 1A illustrates an example of a communications system 100a that includes the service provider 120, an access network 130, and a target network 110. The service provider 120 provides a subscription-based service connecting user terminals (UTs) 145a, 145b to the target network 110 (e.g., the Internet) via access links 140a, 140b to the access network 130. The service provider 120 includes traffic management systems 122a, 122b respectively configured to dynamically and automatically manage network traffic flow to individual user terminals sharing access links 140a, 140b. The access network 130 can include any suitable means of communication such as satellites and/or terrestrial-based communication links User terminals (UTs) correspond to subscribers, and the term user terminal (UT) is used synonymously and interchangeably with the term "subscriber."

The access network 130 provides connectivity between the service provider 120 and the UTs 145a, 145b. The access network 130 can include one or more access links 140a, 140b that respectively provide connectivity to UTs 145a, 145b to the access network 130 and, thus, the target network 110. The first group of UTs 145a connected to the access network 130 through the first access link 140a include a plurality of user terminals listed as UT A, UT B, . . . , UT N. Similarly, the second group of UTs 145b connected to the access network 130 through the second access link 140b include a plurality of user terminals listed as UT A, UT B, . . . , UT N.

The user terminals 145a, 145b may be grouped based on geography, network structures, subscription plans, network equipment, or the like. In some embodiments, the access network 130 can include more than two access links Each access link can include a different number of UTs. It should be understood, however, that the disclosed systems and methods function where there is a single access link provided to the access network 130. Similarly, the disclosed systems and methods can operate based on data usage relative to the access network 130 rather than (or in addition to) data usage relative to individual access links 140a, 140b.

Individual user terminals within the groups of UTs 145a, 145b can communicate with access network 130 using a transceiver, router, and/or other similar devices and systems, which are not shown here for clarity. Similarly, the service provider 120 can communicate with the access network 130 and the target network 110 using a provider gateway, a gateway transceiver, and other similar devices and systems, which are not shown here for clarity. The access network 130 is configured to send information from the service provider 120 to the UTs 145a, 145b through the appropriate access link 140a, 140b, and configured to send information from the UTs 145a, 145b to the service provider 120 through these same access links By way of example, an individual user terminal transmits data to the service provider 120 through the access network 130 using an appropriate access link 140a or 140b. After reaching the service provider 120, the data is directed to the target network 110 (e.g., the Internet). Data from the target network 110 is sent to the appropriate user terminal by the service provider 120 via the appropriate access link 140a or 140b of the access network 130.

The service provider 120 includes traffic management systems 122a, 122b for managing traffic downloaded to corresponding groups of UTs 145a, 145b. Traffic management system 122a manages network traffic to UTs 145a linked to access link 140a. The traffic management system 122a includes UT usage control 126 and access link congestion control 128. UT usage control 126 is configured to manage network traffic for individual subscribers. This can be done to prevent excessive data usage resulting in surpassing plan data limits Access link congestion control 128 is configured to keep traffic transmitted through access link 140a within the capacity of the access link Traffic management system 122b is generally the same and operates on network traffic to UTs 145b linked to access link 140b. In some embodiments, an individual traffic management system of the service provider 120 can manage network traffic to user terminals in more than one spot beam.

The traffic management systems 122a, 122b can also provide an interface between the target network 110 and the access network 130 and/or another network. The traffic management systems 122a, 122b receive data and information from the target network 110 that is directed to individual UTs. The traffic management systems 122a, 122b shape the data for delivery to the appropriate UT via the access network 130. The data can be shaped based at least in part on the type of data, the application associated with the data, the relative data usage of the destination UT, the historical usage rate of the destination UT, network congestion on the associated spot beam, etc. In some embodiments, part or all of the traffic management systems 122a, 122b can be located in a virtual device residing in a public or private computing cloud.

The traffic management systems 122a, 122b can be configured to operate continuously or intermittently on network traffic to the UTs 145a, 145b. In some embodiments, the traffic management systems 122a, 122b can operate only during targeted time periods. For example, the traffic management systems 122a, 122b can be configured to operate during peak busy periods. A peak busy period can be a specified time during a particular day (e.g., 7-11 pm Monday through Friday, and 7-12 pm Saturday and Sunday). Alternatively, a peak busy period can be defined as a time during which congestion on the relevant access link 140a, 140b exceeds a threshold. A combination of the foregoing is also possible.

In some embodiments, portions of the traffic management systems 122a, 122b can be configured to accumulate feedback usage data (that is, usage data feedback) during defined or designated time periods (e.g., the targeted time periods such as peak usage periods). Similarly, portions of the traffic management systems 122a, 122b can be configured to restrict data downloading to certain user terminals only during those designated time periods. In some embodiments, specialty shapers in the traffic management systems 122a, 122b can operate constantly or one or more of the specialty shapers can operate constantly. In some embodiments, the traffic management systems 122a, 122b can bypass subscriber-specific shapers but otherwise shape network traffic using one or more of the specialty shapers. In various embodiments, the traffic management systems 122a, 122b can have a default operational mode where subscribers are granted maximum available data speeds.

Figure 2:
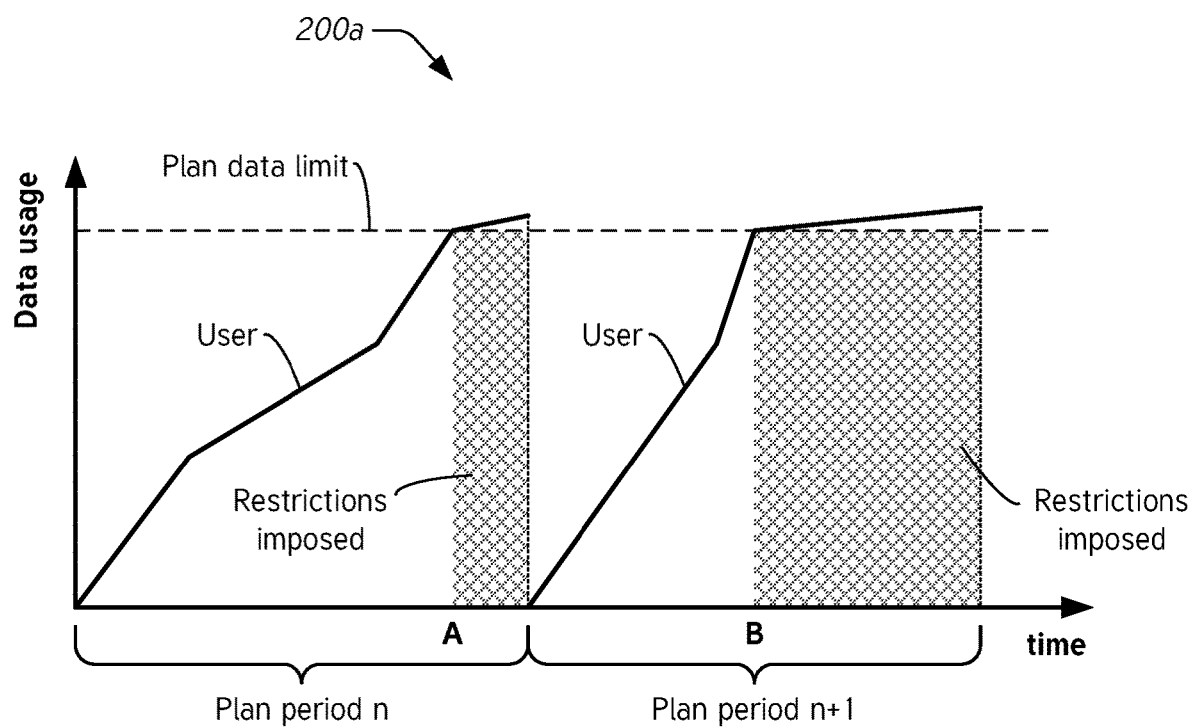
FIG. 2 illustrates example graphs of network data usage over time.
Figure 2:
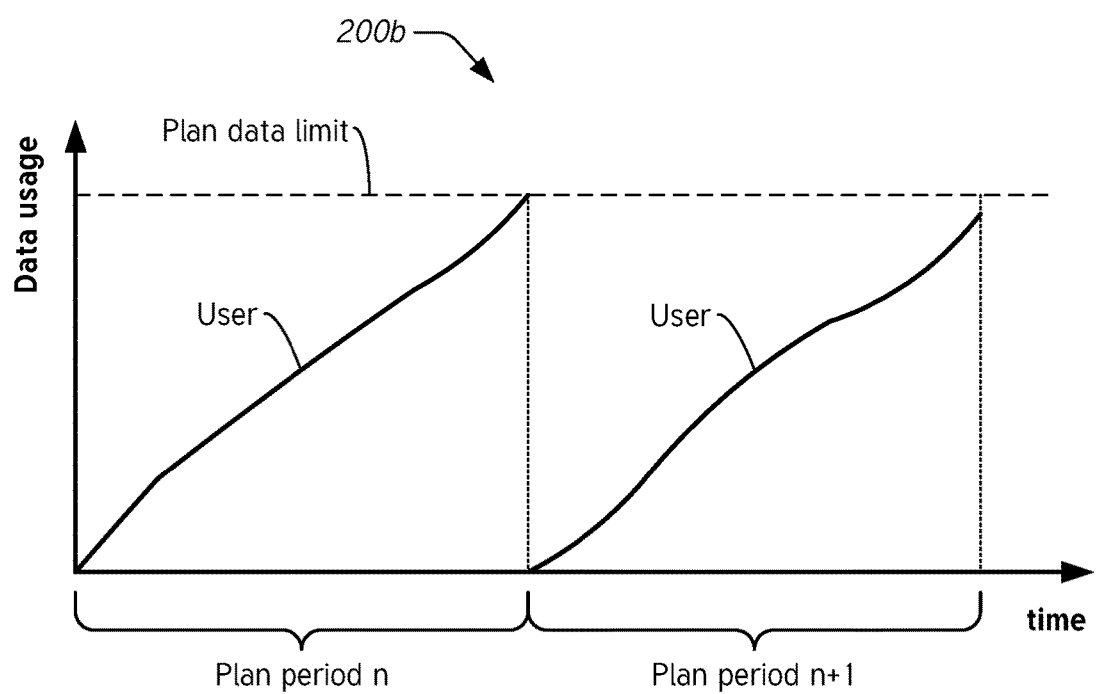

FIG. 2 illustrates example graphs 200a, 200b of network data usage over time to demonstrate the effects of the traffic management systems 122a, 122b on subscriber data usage. The top graph 200a illustrates a subscriber (or user) of a service provider that primarily imposes data restrictions only after the subscriber surpasses their plan data limit. During an nth plan period, the subscriber uses all of their plan data limit at time point A. As a result, restrictions are placed on the subscriber until the end of plan period n. At the start of the next plan period (plan period n+1), the restrictions are removed, and the subscriber is again allowed to download data at a maximum rate. But as shown, the subscriber again reaches their download limit at time point B, which is well before the end of plan period n+1. As a result, at time point B, the subscriber is again subjected to a severe restriction on downloading data until the start of the next plan period (not shown in FIG. 2).

In contrast, the bottom graph 200b illustrates a subscriber (or user) of a service provider that implements the traffic management systems described herein. The data usage of the user is regulated throughout the plan period to avoid the user surpassing their plan data limit. The result can be that at no point during the plan period is the subscriber experiencing drastic or sever data rate restrictions. For example, the current data rate of the user during plan period n fluctuates and is configured to allow the user to utilize an amount of data equal to the plan data limit. In some embodiments, the traffic management systems result in the user using less data than the plan data limit, as shown in plan period n+1.

Referring again to FIG. 1A, although not illustrated, it is to be understood that the service provider system 120 includes one or more processors configured to execute computer executable instructions that implement the traffic management systems 122a, 122b with the UT usage control 126 and the access link congestion control 128. The service provider system 120 also includes one or more data storage devices configured to store data associated with the traffic management systems 122a, 122b as well as computer executable instructions. Examples of suitable processors and data storage devices are provided elsewhere herein.

FIG. 1B illustrates another example of a communications system 100b with an access network 130b connecting groups of user terminals 145a, 145b with the service provider 120. The access network 130 includes a satellite 132 to provide connectivity between the service provider 120 and the UTs 145a, 145b. The satellite 132 provides spot beams 140a, 140b, similar to the access links 140a, 140b of FIG. 1A, with corresponding groups of UTs 145a, 145b. The first group of UTs 145a in the first spot beam 140a include a plurality of user terminals listed as UT A, UT B, . . . , UT N. Similarly, the second group of UTs 145b in the second spot beam 140b include a plurality of user terminals listed as UT A, UT B, . . . , UT N. The satellite 132 can provide more than two spot beams. Each spot beam can include a different number of UTs. By way of example, each spot beam can include about 1500 UTs, but it should be understood that a spot beam can have fewer or more than 1500 UTs.

The remaining components of the communications system 100b provide the same relevant functionality as those components of the communications system 100a described herein with reference to FIG. 1A with the understanding that communication between user terminals 145a, 145b and the service provider 120 is provided using the access network 130b. It should be understood that the access network 130b can include a plurality of satellites in combination with one or more terrestrial networks. The user terminals 145a, 145b can be grouped in the spot beams 140a, 140b similar to user terminal groups associated with the access links 140a, 140b described herein with reference to FIG. 1A. Thus, although the disclosure herein focuses on user terminals and corresponding access links, it should be understood that the systems and methods herein can be applied to the access network 130b that uses one or more satellites 130b producing one or more spot beams.

In some embodiments, the satellite 132 is a satellite network with a plurality of satellites. In some embodiments, the satellite 132 can include a geosynchronous earth orbit (GEO) satellite or satellites, a medium earth orbit (MEO) satellite or satellites, and/or a low earth orbit (LEO) satellite or satellites.

Individual user terminals within the groups of UTs 145a, 145b can communicate with the satellite 132 using a remote satellite transceiver, router, and other similar devices and systems, which are not shown here for clarity. Similarly, the service provider 120 can communicate with the satellite 132 and the target network 110 using a provider gateway, a gateway satellite transceiver, and other similar devices and systems, which are not shown here for clarity. The access network 130b includes a forward link for sending information from the service provider 120 to the UTs 145a, 145b, and a return link for sending information from the UTs 145a, 145b to the service provider 120. By way of example, an individual user terminal transmits data to the service provider 120 through the access network 130b via the return link After reaching the service provider 120, the data is directed to the target network 110 (e.g., the Internet). Data from the target network 110 is sent to the appropriate user terminal by the service provider 120 via the forward link of the access network 130b.

In some embodiments, the access network 130b may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like.

In some embodiments, the access network 130b includes one or more additional networks (e.g., terrestrial based networks). For example, the access network 130b can include a terrestrial network between the satellite 132 and the service provider 120 and terrestrial networks between corresponding groups of UTs 145a, 145b and the satellite 132. In certain embodiments, the access network 130b includes terrestrial networks that connects satellite receivers in a spot beam of the satellite 132 to user terminals located outside the spot beam. The terrestrial networks may be any type of network and may include, for example, the Internet, an IP network, an intranet, a wide-area network (WAN), a local-area network (LAN), a virtual private network (VPN), a public switched telephone network (PSTN), a public land mobile network, a digital subscriber line (DSL), a cellular network, wireless local area network (WLAN) access point (AP) connected to DSL, or any combination of these.

Example Traffic Management System

Figure 3:
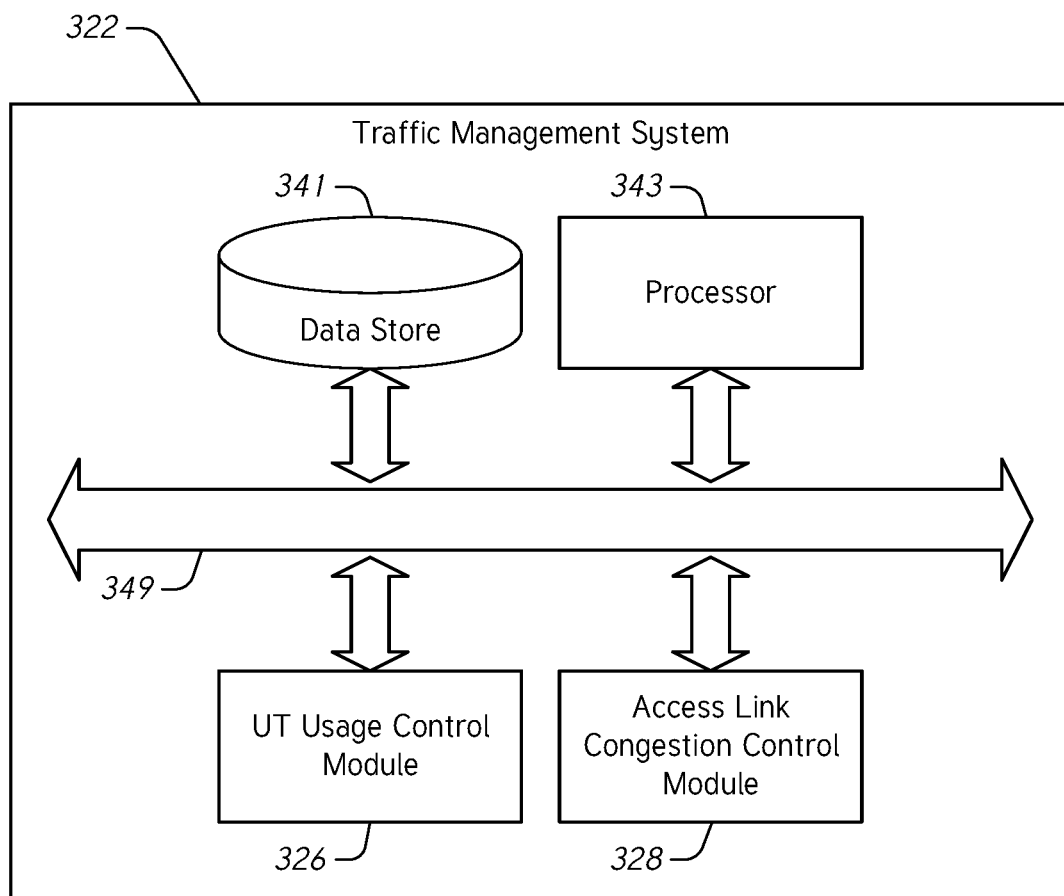
FIG. 3 illustrates a block diagram of an example traffic management system configured to dynamically manage network traffic for individual subscribers.

FIG. 3 illustrates a block diagram of an example traffic management system 322 configured to dynamically manage network traffic for individual subscribers. The traffic management system 322 is similar to the traffic management systems 122a, 122b described herein with reference to FIGS. 1A and 1B and can be implemented in the networking or communications systems there described. The traffic management system 322 can employ any method described herein for managing subscriber network traffic, such as the example method 500 described herein with reference to FIG. 5.

The traffic management system 322 can include hardware, software, and/or firmware components for managing, shaping, and directing network traffic to individual user terminals. The traffic management system 322 is configured to receive network traffic intended for particular user terminals, to shape the network traffic, and to output the shaped network traffic wherein the shaped network traffic is based on the historical usage rate of the intended user terminal, short-term usage rate of user terminals with the same subscriber plan, and/or access link congestion levels. The traffic management system 322 is also configured to determine access link congestion levels, relative user terminal weight factors, and enforcement rates for offered subscriber plans. The traffic management system 322 can include a data store 341, one or more processors 343, a UT usage control module 326, and an access link congestion control module 328. Components of the traffic management system 322 can communicate with one another, with external systems, and with other components of a network using communication bus 349. The traffic management system 322 can be implemented using one or more computing devices. For example, the traffic management system 322 can be implemented using a single computing device, multiple computing devices, a distributed computing environment, or it can be located in a virtual device residing in a public or private computing cloud. In a distributed computing environment, one or more computing devices can be configured to provide the modules described herein to provide the described functionality.

The traffic management system 322 includes the UT usage control module 326. The UT usage control module 326 is an example of the UT usage control module 126 described herein with reference to FIGS. 1A and 1B. The UT usage control module 326 is configured to receive traffic intended for a particular user terminal and to output usage-shaped traffic. The UT usage control module 326 does this by determining long-term historical usage data for the intended user terminal as well as an average of the short-term data usage for user terminals with the same subscriber plan as the intended user terminal. The UT usage control module 326 adjusts a provisioning rate associated with the subscriber plan to generate an enforcement rate based on the average short-term usage rate of the user terminals with the same subscriber plan. The UT usage control module 326 also generates shaper settings for specialty shapers as well as weights for the intended user terminal. The weights for the intended user terminal can be used, as described herein, to further shape or modify the network traffic to ensure that the user terminal utilizes a targeted data rate. Further examples of UT usage control modules and systems are described herein with reference to FIGS. 1A, 1B, 4A and 4B.

The traffic management system 322 includes the access link congestion control module 328. The access link congestion control module 328 is an example of the access link congestion control module 128 described herein with reference to FIGS. 1A and 1B. The access link congestion control module 328 is configured to receive usage-shaped traffic from the UT usage control module 326 and to output traffic to the intended user terminal, wherein the output traffic has been further shaped based on factors that may include, for example, the user terminal weights received from the UT usage control module 326. In some embodiments, the access link congestion control module 328 is further configured to determine access link congestion levels and to modify the usage-shaped traffic based on the determined access link congestion levels. In some embodiments, the access link congestion control module 328 is configured to monitor access link capacity relative to access link usage and to modify parameters so that, for example, when average data usage exceeds the access link capacity each user gets less traffic allocated to them until congestion approaches access link capacity. Further examples of access link congestion control modules and systems are described herein with reference to FIGS. 1A, 1B, 4A and 4B.

The traffic management system 322 includes one or more processors 343 that are configured to control operation of the modules 326, 328 and the data store 341. The one or more processors 343 implement and utilize the software modules, hardware components, and/or firmware elements configured to automatically configure devices at a remote site. The one or more processors 343 can include any suitable computer processors, application-specific integrated circuits (ASICs), field programmable gate array (FPGAs), or other suitable microprocessors. The one or more processors 343 can include other computing components configured to interface with the various modules and data stores of the traffic management system 322.

The traffic management system 322 includes the data store 341 configured to store configuration data, subscriber data, plan data, usage data, device data, databases, data tables, algorithms, executable instructions (e.g., instructions for the one or more processors 343), and the like. The data store 341 can be any suitable data storage device or combination of devices that include, for example and without limitation, random access memory, read-only memory, solid-state disks, hard drives, flash drives, bubble memory, and the like.

Example UT Usage Control System

Figure 4A:
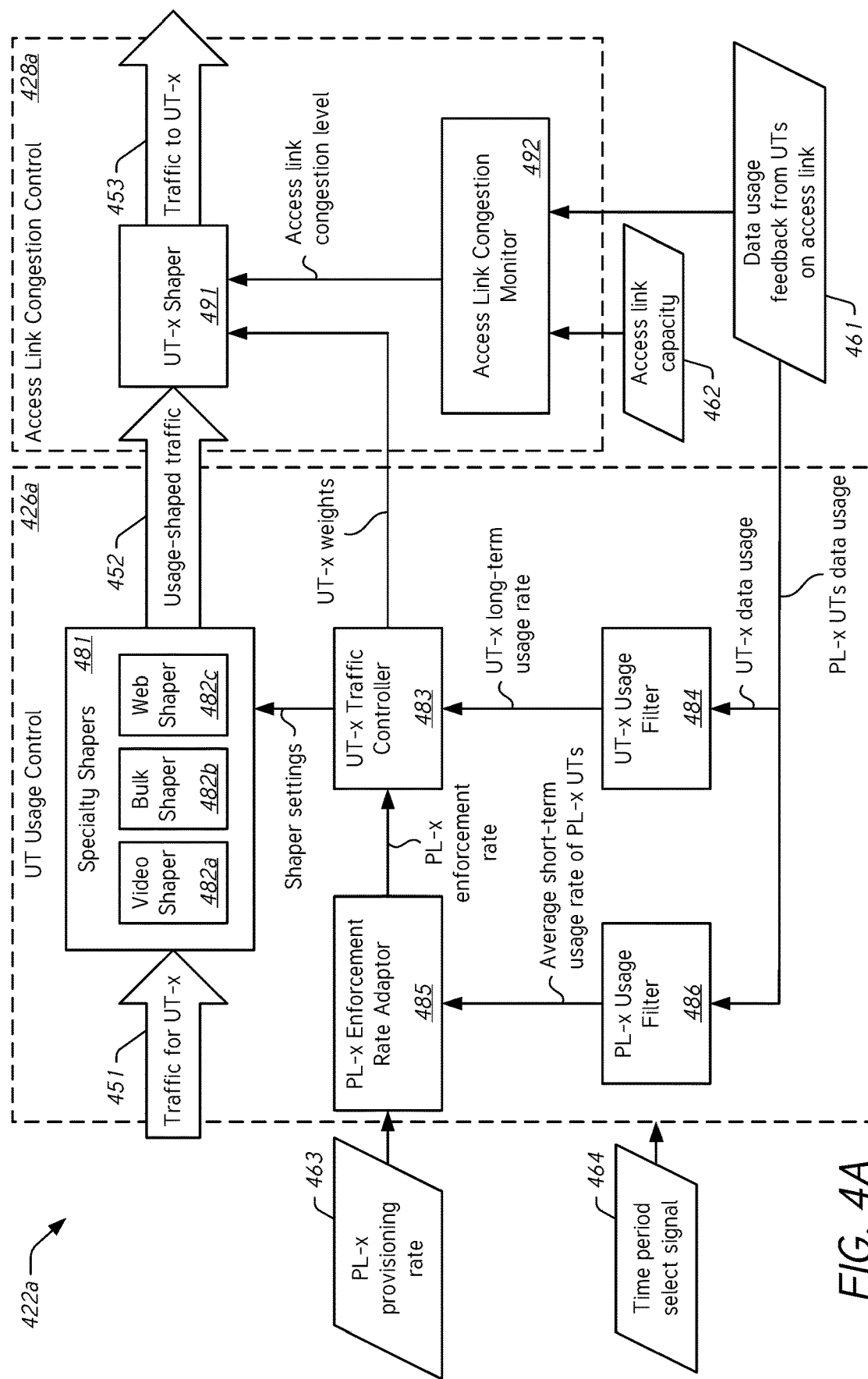
FIGS. 4A and 4B illustrate block diagrams of example traffic management systems.

FIG. 4A illustrates a functional block diagram of an example traffic management system 422a that includes a UT usage control system 426a and an access link congestion control system 428a. The example traffic management system 426a is illustrated as operating on data intended for a particular user terminal referred to as UT-x coupled to a particular access link (e.g., within a particular beam spot of a satellite). The subscriber associated with UT-x has a subscription plan referred to as PL-x. Traffic intended for UT-x is received by the traffic management system 422a, which utilizes the UT usage control system 426a and the access link congestion control system 428a as described herein to shape, modify, format, and/or schedule (e.g., regulate) the data prior to sending it on to UT-x. As noted above, each UT corresponds to a subscriber.

The data traffic 451 identified as traffic for UT-x can be received from a target network, such as the target network 110 described herein with reference to FIGS. 1A and 1B. Prior to being received by the traffic management system 422a, the traffic for UT-x 451 can be sorted and/or marked by destination UT, source, data type, etc. This can be accomplished, for example, using deep packet inspection (DPI) or other similar process. The traffic for UT-x 451 can be part of the output of such processing.

The UT usage control system 426a includes UT-x specialty shapers 481, UT-x traffic controller 483, UT-x usage filter 484, PL-x enforcement rate adaptor 485, and PL-x usage filter 486. The access link congestion control system 428a includes UT-x shaper 491 and beam congestion monitor 492.

The UT usage control system 426a includes the UT-x usage filter 484 that is configured to determine a long-term usage rate (an example of a past usage rate) for the individual subscriber UT-x of a particular user terminal or subscriber associated with the user terminal. It should be understood that although only one UT-x usage filter 484 is shown in FIG. 4A, the UT usage control system 426a includes a UT-x usage filter 484 for each user in the spot beam associated with the traffic management system 422a. As used herein, the term "long-term" includes a period of time longer than a plan period and may be a multiple of the plan period. For example, if the plan period is 1 month, a long-term average can be determined using a 3-month or 90-day period of time. Other examples of the period of time include greater than or equal to 30 days, 1 month, 60 days, 2 months, or the like. The UT-x usage filter 484 receives as input data usage of the subscriber with UT-x. The UT-x usage filter 484 determines the long-term usage rate of UT-x. The long-term usage rate can be calculated as an average (e.g., the total data used during the long-term period divided by the amount of time of the long-term period), as a weighted average, a rolling average, an exponentially weighted average, etc. The long-term usage rate of UT-x can be used to determine a weighting factor that influences the data rate available for the UT-x, as described herein. The UT-x usage filter 484 can be an averaging, normalizing, and/or weighting filter. As noted, the long-term usage rate of UT-x illustrated in FIGS. 4A and 4B and as used throughout this disclosure is an example of a "past data usage rate" for the subscriber that corresponds to UT-x tabulated (e.g., averaged, weighted average, etc.) over a long-term (which is an example of a first predetermined length of time).

The UT usage control system 426a includes the PL-x usage filter 486 that is configured to determine an average short-term usage rate of all user terminals that subscribe to a particular subscription plan. It should be understood that although only one PL-x usage filter 486 is shown in FIG. 4A, the UT usage control system 426a includes a PL-x usage filter 486 for each subscription plan offered by the service provider (e.g., the service provider 120 described herein with reference to FIGS. 1A and 1B). As used herein, the term "short-term" includes a period of time shorter than a plan period and may be a fraction of the plan period. For example, if the plan period is 1 month, then a short-term average can be determined using a 7-day period of time. The PL-x usage filter 486 receives as input data usage feedback from all UTs in the same spot beam that subscribe to the same subscription plan. In this example, this would be all subscribers with the subscription plan PL-x, which is the same plan as the subscriber associated with UT-x. The PL-x usage filter 486 determines an average short-term usage rate of the subscribers with the plan PL-x. This corresponds to the average short-term usage rate per user terminal of all the user terminals in the spot beam associated with the traffic management system 422a with the subscriber plan PL-x. In some embodiments, the average can be calculated using the total data usage during the short-term period of time divided by the number of subscribers or UTs with plan PL-x and also divided by the short-term period of time. In certain implementations, the average can be calculated using a subset of the total data usage during the short-term period of time divided by the number of subscribers in that subset and also divided by the total period of time corresponding to the subset. For example, the subset of the total data usage can correspond to data associated with particular (e.g., targeted) periods of time during the short-term time period, such as usage data during peak busy hours. The average can be weighted, a rolling average, exponentially weighted, or the like. The PL-x usage filter 486 can be an averaging, normalizing, and/or weighting filter.

The UT usage control system 426a includes the PL-x enforcement rate adaptor 485 that is configured to dynamically determine an enforcement data rate for the subscriber plan PL-x. It should be understood that although only one PL-x enforcement rate adaptor 485 is shown in FIG. 4A, the UT usage control system 426a includes a PL-x enforcement rate adaptor 485 for each subscription plan offered by the service provider (e.g., the service provider 120 described herein with reference to FIGS. 1A and 1B). The PL-x enforcement rate adaptor 485 receives as input a provisioning rate 463 for the plan PL-x. The provisioning rate 463 is the usage rate of plan PL-x or a variation thereof. In some embodiments, the provisioning rate is related to the expectation value of actual usage in a peak busy period (PBP) of a subscriber with the plan PL-x in a plan period in the case that the service provider is loaded to using all available or sellable capacity (e.g., capacity of the access network, access link, or spot beam corresponding to the traffic management system 422a). This may fluctuate and may deviate from the stated usage rate of the plan PL-x. The PL-x enforcement rate adaptor 485 also receives as input the average short-term usage rate of PL-x UTs determined by the PL-x usage filter 486, described herein. The PL-x enforcement rate adaptor 485 determines an enforcement rate that may be the same as, larger than, or smaller than the PL-x provisioning rate 463. The PL-x enforcement rate is a dynamically adjusted version of the PL-x provisioning rate 463. The PL-x enforcement rate is based on the PL-x provisioning rate 463 and then dynamically adjusted to keep the average short-term usage rate of PL-x UTs from exceeding the PL-x provisioning rate 463. For example, the PL-x enforcement rate adaptor 485 can compare the PL-x provisioning rate 463 to the average short-term usage rate of PL-x UTs, and if the PL-x provisioning rate 463 is greater, the PL-x enforcement rate adaptor 485 increases the PL-x enforcement rate. If, however, the PL-x provisioning rate 463 is less than average short-term usage rate of PL-x UTs, the PL-x enforcement rate adaptor 485 decreases the enforcement rate. The foregoing are examples only. In some embodiments, the enforcement rate PL-x can be the provisioning rate PL-x unmodified.

The UT usage control system 426a includes the UT-x traffic controller 483 that is configured to determine settings for the specialty shapers 481 and to determine weights for the UT-x shaper 491. It should be understood that although only one UT-x traffic controller 483 is shown in FIG. 4A, the UT usage control system 426a includes a UT-x traffic controller 483 for each user coupled to the access link associated with the traffic management system 422a. The UT-x traffic controller 483 receives as input the PL-x enforcement rate from the PL-x enforcement rate adaptor 485 and the UT-x long-term usage rate from the UT-x usage filter 484. The UT-x traffic controller 483 uses these inputs to determine shaper settings for the specialty shapers 481 and UT-x weights for the UT-x shaper 491.

The shaper settings are configured to limit the data speed allowed by the specialty shapers so that the long-term usage rate of UT-x does not exceed the PL-x enforcement rate. As an example, a table can be constructed that includes shaper settings (e.g., data speeds for certain types of network traffic). An example of such a table is included herein as TABLE 1. The UT-x traffic controller 483 assigns each UT coupled to the corresponding access link a state variable (e.g., the state variable n, where 0≤n≤N). The UT-x traffic controller 483 compares the PL-x enforcement rate to the UT-x long-term usage rate and if the values are different, the UT-x traffic controller changes the state of UT-x. Changing the state of the UT-x is equivalent in this case to increasing (e.g., moving left or n=i+x with x=1, 2, 3, ... ) or decreasing (e.g., moving right or n=i–x with x=1, 2, 3, ... ) the state variable in the table (e.g., see TABLE 1). For example, if the UT-x long-term usage rate exceeds the PL-x enforcement rate, the state variable can decrease (corresponding to allocating less bandwidth to UT-x) and if the UT-x long-term usage rate is less than the PL-x enforcement rate, the state variable can increase (corresponding to allocating more bandwidth to UT-x). Each value of the state variable in the table includes shaper settings for different types of data traffic. The examples included here are video, bulk, and web.

TABLE 1

| | PBP Only? | State | | | | |
|---|---|---|---|---|---|---|
| | | N | ... | i | ... | 0 |
| Video | N | S_vidmax | | 0.9 | | 0 |
| Bulk | Y | S_bulkmax | | 10 | | 0 |
| Web | Y | S_webmax | | 6 | | 0 |
| UT Weight | n/a | W_max | | 10 | | 0 |

TABLE 1 includes values for shaper settings for different kinds of data as well as UT-x weights for each value of the state variable. The minimum value of the state variable is 0 which corresponds to allocating little to no bandwidth to UT-x. Each entry in the table has a maximum value corresponding to the maximum value of the state variable. In addition, the column labeled "PBP Only?" includes a flag that decides whether to implement shaping on that type of data. This table entry can be used to selectively apply the shaping parameters, limiting their use to targeted times such as peak usage times, for example and without limitation. In some embodiments, the PBP Only flag can operate independently of the value of the time period select signal 464 described elsewhere herein.

The UT-x weights are configured to be used by the UT-x shaper 491 to schedule bandwidth and to allocate bandwidth. The UT-x weights can be used to determine relative weights among active users to adjust bandwidth allocation and scheduling based on the relative weights. The UT-x traffic controller 483 can use a state table (e.g., TABLE 1) to determine the UT-x weights. As described above, the UT-x traffic controller 483 compares the PL-x enforcement rate to the UT-x long-term usage rate and if the values are different, the UT-x traffic controller changes the state of UT-x which corresponds to changing the UT-x weight. For example, if the UT-x long-term usage rate exceeds the PL-x enforcement rate, the state variable can decrease (corresponding to allocating less bandwidth to UT-x) and if the UT-x long-term usage rate is less than the PL-x enforcement rate, the state variable can increase (corresponding to allocating more bandwidth to UT-x).

The UT usage control system 426a includes the UT-x specialty shapers 481 that are configured to selectively shape (e.g., format, modify, alter, etc.) the traffic for UT-x depending on the type of network traffic and/or the application requesting the network traffic. It should be understood that although only one UT-x specialty shapers 481 is shown in FIG. 4A, the UT usage control system 426a includes a UT-x specialty shaper 481 for each user in the spot beam associated with the traffic management system 422a. The UT-x specialty shapers 481 receive as input the traffic for UT-x 451 (e.g., download traffic from the Internet destined for UT-x) and the shaper settings from the UT-x traffic controller 483. The specialty shapers 482a-482c can be configured to shape with or without dropping packets, e.g., using queuing rather than dropping.

The UT-x specialty shapers 481 includes dedicated shaper modules for certain types of network data and/or for certain applications requesting network data. The UT-x specialty shapers 481 includes a video shaper module 482a, a bulk shaper module 482b, and a web shaper module 482c. Other specialty shapers may also be included in the UT-x specialty shapers such as a P2P shaper module. The UT-x specialty shapers 481 are configured to output usage-shaped traffic for the UT-x shaper 491. Each specialty shaper 482a-482c shapes a particular type of traffic destined for UT-x. The video shaper module 482a is configured to shape video traffic downloaded to UT-x. The video shaper module 482a can use known adaptive video techniques, e.g., it can drop video data packets until the source of the data sends video data having a targeted resolution. The video shaper module 482a can be configured to maintain the quality of video while reducing a data rate of the video. The bulk shaper module 482b is configured to shape large bulk transfers to UT-x. The web shaper module 482c is configured to shape web traffic to UT-x. The web shaper module 482c can be configured to reduce data rates for web traffic before other types of network traffic are restricted. The UT-x specialty shapers 481 output usage-shaped traffic 452 to be further shaped by the UT-x shaper 491.

The access link congestion control system 428a includes the access link congestion monitor 492 that is configured to determine access link congestion level. The access link congestion control system 428a includes one access link congestion monitor 492 per access link. The access link congestion monitor 492 is configured to receive as input data usage feedback 461 from all UTs coupled to the corresponding access link and access link capacity 462. The access link capacity 462 corresponds to the maximum data rate capacity of the access link corresponding to the traffic management system 422a. The access link congestion monitor 492 uses these inputs to determine the access link congestion level. The access link congestion level indicates the current congestion level of the corresponding access link.

The access link congestion control system 428a includes the UT-x shaper 491 that is configured to further modify or shape traffic destined for the UT-x that has been shaped by the UT-x specialty shapers 481. The UT-x shaper 491 is configured to shape the usage-shaped traffic 452 based at least in part on access link congestion levels determined by the access link congestion monitor 492 and UT-x weights determined or assigned by the UT-x traffic controller 483. It should be understood that although only one UT-x shaper 491 is shown in FIG. 4A, the UT usage control system 426a includes a UT-x shaper 491 for each user coupled to the access link associated with the traffic management system 422a. The UT-x shaper 491 receives as input the usage-shaped traffic 452 from the UT-x specialty shapers 481, UT-x weights from the UT-x traffic controller 483, and the access link congestion level from the access link congestion monitor 492. The UT-x shaper 491 shapes traffic data and outputs traffic to UT-x 453, also referred to as UT-shaped traffic. The UT-x shaper 491 can be configured to shape traffic data using queuing rather than dropping packets. Traffic to UT-x or UT-shaped traffic 453 is network traffic that is to be sent over the access network to UT-x. The UT-x shaper 491 is configured to slow transmission of the usage-shaped traffic 452 to UT-x as needed to keep the access link congestion level from exceeding the access link capacity.

In some embodiments, the UT-x shaper 491 can be bypassed or the UT-x shaper 491 can be configured to not modify the usage-shaped traffic 452. Such embodiments provide traffic management using the specialty shapers 481 as described herein and not the UT-x weights determined by the UT-x traffic controller 483. In certain embodiments, instead of the UT-x shaper 491 being used for managing user traffic, other mechanisms are used in addition to the specialty shapers 481.

Thus, the traffic management system 422a acts as an adaptive UT-x traffic shaper because it adjusts the amount it shapes and modifies the usage-shaped traffic 452 based on feedback regarding access link capacity, access link usage, and access link congestion levels. In some embodiments, the access link congestion level can be determined or estimated using a proportional-integral (PI), a proportional-derivative (PD), and/or a fuzzy logic feedback controller. The access link congestion level can be determined based at least in part on an available traffic rate and a targeted traffic rate. This in turn allows the UT-x shaper 491 to change the data rate of UT-x based at least in part on the long-term average usage relative to the enforcement rate and the access link congestion level. In some embodiments, a gradient of a utility function and a resource control function are used to determine UT-x weights. In such embodiments, the UT-x shaper 491 can be configured to yield an equilibrium as active UTs are attempting to maximize its utility using the same utility function and rule sets. Using this approach, and based at least in part on the demand level, each UT may achieve a long-term data rate that is less than or equal to the maximum provisioning rate of the service plan.

Operation of the UT-x Traffic Controller 483 (e.g., generating shaper settings and/or UT-x weights as described above) and/or operation of the Access Link Congestion Monitor 492 are examples of regulating (e.g., restricting, shaping, modifying, controlling, etc.) the current data usage rate for an individual subscriber UT-x.

A time period select signal 464 can be received as input to the traffic management system 422a. The time period select signal 464 can be used to selectively enable and disable one or more sub-components of the traffic management system 422a. This can be done, for example, to control operation of the traffic management system 422a so that it manages user terminal traffic when the time period select signal 464 is asserted. This allows the traffic management system 422a to monitor and to restrict data usage of a user terminal only during targeted or designated time periods, such as peak busy periods. This also allows certain components of the UT usage control system 426a and/or the access link congestion control system 428a to be bypassed, such as the UT-x shaper 491 or one or more of the specialty shapers 482a-482c, during designated or selected time periods.

Similarly, the PL-x usage filter 486 and the UT-x usage filter 484 can be configured to restrict the times when they accumulate feedback usage data to be during defined or designated time periods. Moreover, the UT-x traffic controller 483 and/or one or more of the UT-x specialty shapers 481 can be configured to restrict data downloading to UT-x only during those time periods. For example, specialty filters 482a-482c can operate continuously or one or more of them may operate continuously. In some embodiments, the traffic management system 422a enables traffic for UT-x to bypass the UT-x shaper 491. In some embodiments, the traffic management system 422a can have default state or operational mode where each subscriber or UT gets the highest available data speed.

As illustrated and described in FIG. 4A, the UT-x shaper 491 is disposed between the UT-x specialty shapers 481 and a transmission module configured to transmit the traffic to UT-x 453 to the targeted UT-x. In such embodiments, other modules may also be utilized prior to sending the traffic to the targeted UT, such as a scheduler. Alternatively, the UT-x shaper 491 can be part of a scheduler 490 that prepares traffic to be transmitted over the access network to UT-x. An example of this configuration is illustrated in FIG. 4B.

Figure 4B:
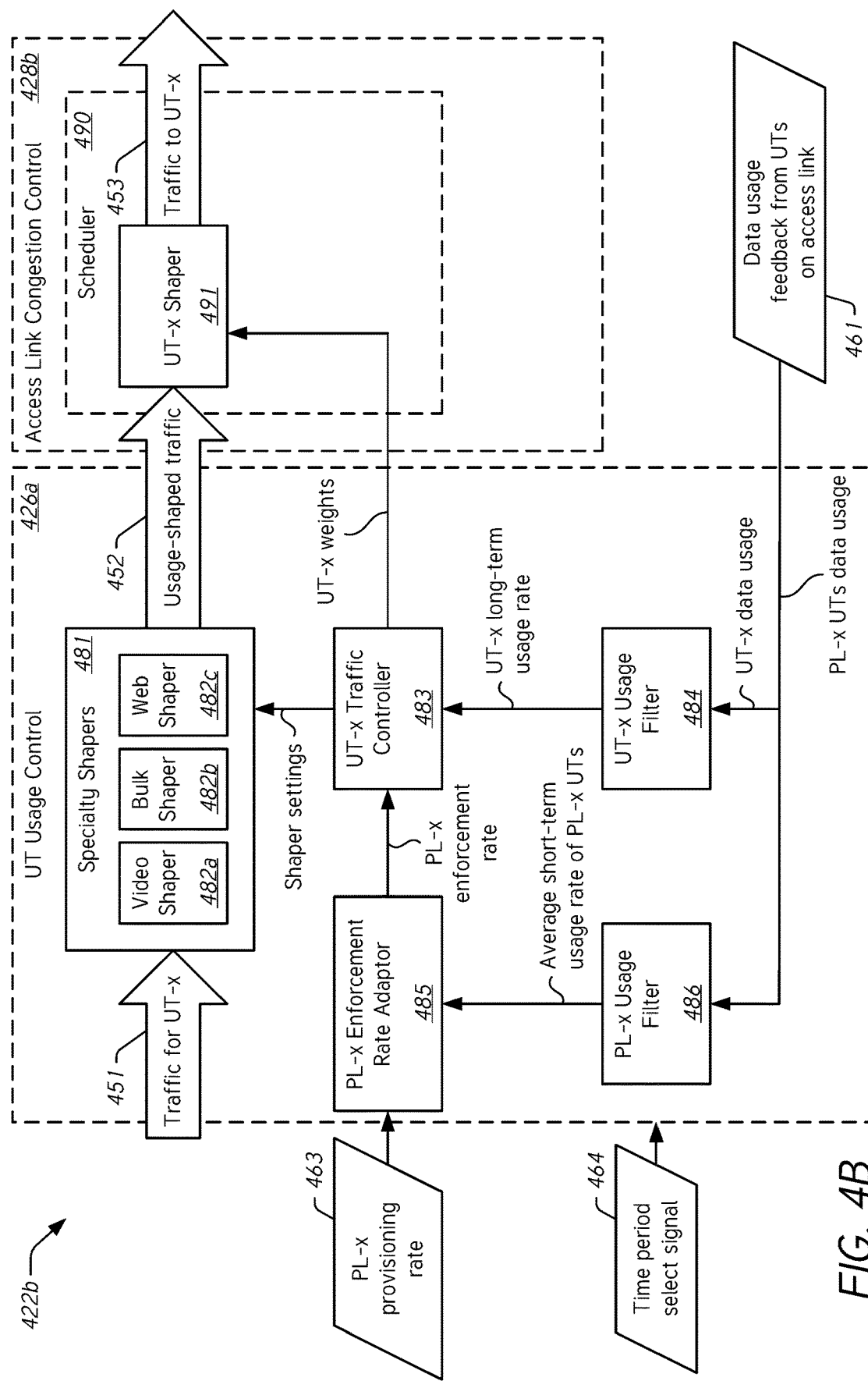

FIG. 4B illustrates a block diagram of another example traffic management system 426b that includes a scheduler 490 in the access link congestion control system 428b. The scheduler 490 can be configured to prepare traffic for transmission to targeted UTs coupled to the corresponding access link. The scheduler 490 can be configured to schedule traffic to and/or from associated user terminals. The scheduler 490 can be configured to allocate bandwidth to user terminals, manage allocation of return-link bandwidth for many user terminals, determine a return-link bandwidth schedule and transmit schedule to user terminal, and assign return-link bandwidth to individual user terminals. The scheduler 490 can utilize a demand assigned multiple access (DAMA) scheduling model, an enhanced mobile satellite services (EMSS) scheduling model, and/or other scheduling techniques. In some embodiments, the scheduler 490 can determine an allocation and schedule for return-link bandwidth based on a request from a user terminal. The scheduler 490 can be configured to analyze the request from the user terminal, network status, network congestion, prior requests, similar requests, and the like to determine a schedule for return-link bandwidth. The scheduler 490 can be configured to generate a schedule based on an estimate of needed bandwidth to complete request and the scheduler 490 can generate individual schedules to avoid allocating overlapping bandwidth schedules to user terminals. In some embodiments, part or all of the scheduler 490 can be located in a virtual device residing in a public or private computing cloud.

The access link congestion control system 428b with the scheduler 490 does not include the access link congestion monitor 492. This is due at least in part to the scheduler 490 already receiving or determining itself access link congestion levels, which is taken into account when the scheduler 490 determines schedules and bandwidth allocations for network traffic to UTs coupled to the access link. For example, the access link congestion level is implicitly estimated by the scheduler 490 during scheduling.

In some embodiments, the traffic management system 422b is configured to control UT data rates using scheduler flow weights modified by the UT-x weights determined by the UT-x traffic controller 483. For example, the scheduler 490 can include a flow weight table that includes weights for application-specific data or specific data types (e.g., video, web, bulk, P2P, etc.). These flow weights can then be modified by multiplying the flow weight by the UT-x weight to determine effective flow weights that may be used to shape the traffic destined for UT-x.

In some embodiments, the UT-x weights can be determined using utility-based resource allocation. Such techniques may include using a utility function, U, a rate-based gradient ascent algorithm that depends on the derivative or gradient of the utility function, U', and a resource control function, R, that depends on the gradient of the utility function. The resource control function can also depend on the access link congestion level. The UT-x traffic controller 483 can be configured to periodically update the UT-x weights using a weight function that is proportional to the resource control function, R, and hence the gradient function, U'. The scheduler 490 can use the UT-x weights as scheduling weights to implement proportionally fair bandwidth allocation among UTs.

As noted, in generating shaper settings for one or more specialty shapers 481 and/or UT-x weights for UT-x Shaper 491, the UT-x Traffic Controller 483 is regulating current data usage of subscriber UT-x. The Usage-shaped traffic 452 and/or Traffic to UT-x 453 are thus examples of a regulated current data usage rate of subscriber UT-x.

Example Methods for Managing Network Traffic to User Terminals

Figure 5:
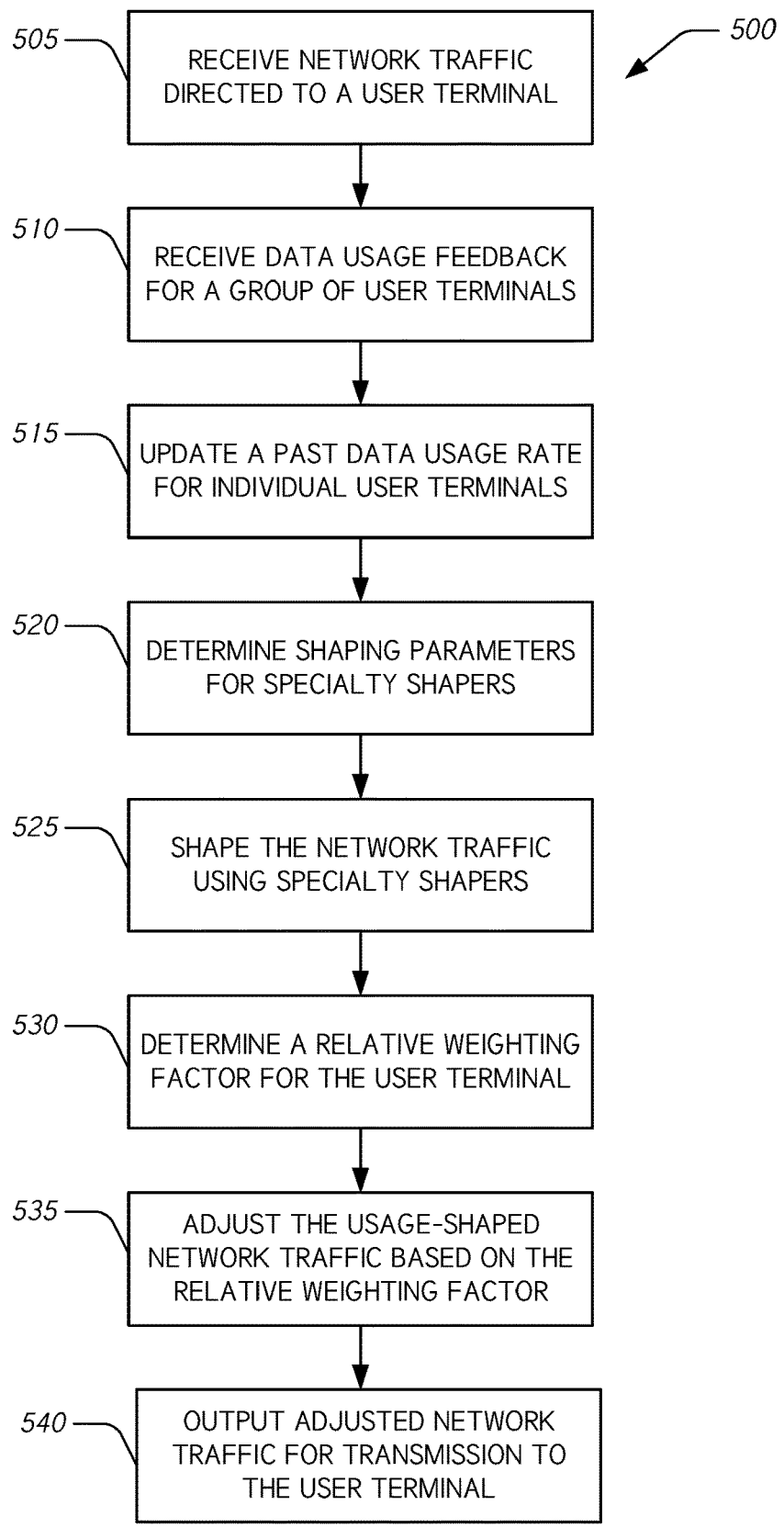
FIG. 5 illustrates a flow chart of an example method for managing network traffic to user terminals.

FIG. 5 illustrates a flow chart of an example method 500 for managing network traffic to user terminals. The method 500 can be performed by any of the traffic management systems described herein with reference to FIGS. 1A, 1B, 3, 4A, and 4B. For ease of description, the method 500 will be described as being performed by a traffic management system. This is not to be understood to limit the scope of the disclosure. Rather, any step or portion of the method 500 can be performed by any component or combination of components of the systems described herein.

In block 505, the traffic management system receives network traffic directed to a particular user terminal connected to an access link (e g, within a spot beam). The network traffic can be received from a target network, such as the Internet. The network traffic can be pre-processed to sort and/or mark the network traffic. This can be done using DPI, for example.

In block 510, the traffic management system receives data usage feedback (e.g., Data usage feedback from UTs on access link 461 of FIGS. 4A and 4B) for a group of user terminals. In block 515, the traffic management system updates a past data usage rate for individual user terminals of the group. The UT-x long-term usage rate of FIGS. 4A and 4B is an example of the past data usage rate and can be calculated or determined (e.g., updated) as discussed above.

As the traffic management system continues to receive data usage feedback for the group of user terminals in block 510, the traffic management system continues to update the past data usage rate for individual user terminals in block 515. Blocks 520 to 540 illustrate an example by which the current data usage rate of individual user terminals can be regulated so that the past data usage rate, as it is being updated, is brought within an enforcement rate (e.g., output of the PL-x Enforcement Rate Adaptor 485 and/or PL-x provisioning rate 463 shown in FIGS. 4A and 4B).

In block 520, the traffic management system determines shaping parameters for specialty shapers. The shaping parameters can be adjusted and tailored based on the past data usage rate of the user terminal as well as the enforcement rate associated with the subscriber plan of the user terminal.

In block 525, the traffic management system shapes the network traffic using one or more specialty shapers with individual specialty shapers using a shaping parameter determined in block 520. The specialty shapers can include video shapers, bulk shapers, web shapers, P2P shapers, and the like. The specialty shapers are configured to adjust network traffic of a targeted data type or associated with a particular application. In some embodiments, one or more of the specialty shapers can be intermittently bypassed depending on the time and/or network congestion levels, such as outside of peak busy periods.

In block 530, the traffic management system determines a relative weighting factor for the intended user terminal based at least in part on past usage rates of the intended user terminal. In some embodiments, the relative weighting factor is also based on short-term usage rates of other user terminals with the same subscriber plan. These short-term usage rates can be used to adjust the provisioning rate for the subscriber plan to generate an enforcement rate for the subscriber plan that may be different than the provisioning rate. In some embodiments, the weighting factor is updated periodically. The update frequency can be at least about every 15 minutes, at least about every 30 minutes, at least about every hour, or at least about every 2 hours. A relatively low weight can be used to allocate less bandwidth than a user with a relatively high weight.

In some embodiments, such as embodiments where the scheduler and the UT-x shaper are part of the same module or system, the relative weighting factor incorporates beam congestion levels. This obviates the need to separately determine beam congestion levels. In various embodiments, such as embodiments where the UT-x shaper is not part of the scheduler, the beam congestion level can be separately determined based on beam capacity and data usage feedback from user terminals within the same spot beam. The beam congestion level can be used to adjust shaping parameters for individual user terminals to achieve a fair distribution of bandwidth allocation across active users. If, for example, average usage exceeds usable capacity, the beam congestion level indicator can be increased. This indicator can be used to determine the bandwidth allocation for each user. An increase in the beam congestion level indicator results in less traffic allocated to each user, resulting in the aggregate data rate of all users decreasing until congestion approaches beam capacity. The beam congestion level can be updated intermittently. The update frequency can be at least about every 15 minutes, at least about every 30 minutes, at least about every hour, or at least about every 2 hours.

In block 535, the traffic management system adjusts the usage-shaped traffic based at least in part on the weighting factor. In some embodiments, the traffic management system also adjusts the usage-shaped traffic based at least in part on beam congestion levels. A scheduler or other component can allocate bandwidth based on the relative weights of all users within a beam spot to maintain beam congestion levels less than a targeted beam usage limit (e.g., less than beam capacity or less than about 85% of beam capacity, etc.). Relative weighting factors can be determined for all active users to allow the traffic management system to adjust bandwidth allocation for all active users to maintain the targeted beam congestion level. The network traffic can be adjusted and data can be queued to maintain traffic within allocated bandwidth rather than dropping data.

In block 540, the traffic management system outputs shaped traffic for the user terminal wherein the traffic has been shaped to avoid or prevent the user terminal from exceeding their plan data limit.

Figure 6:
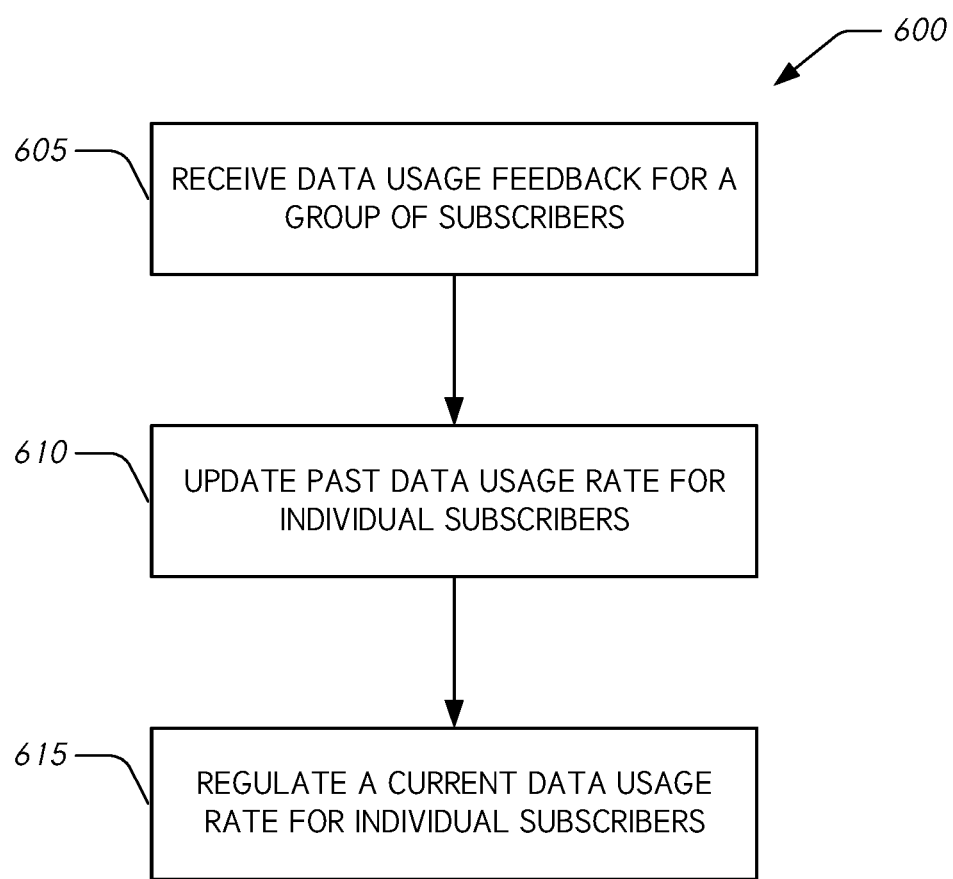
FIG. 6 illustrates a flow chart of an example method for managing network traffic on an access network.

FIG. 6 illustrates a flow chart of an example method 600 for managing network traffic on an access network. The method 600 can be performed by any of the traffic management systems described herein with reference to FIGS. 1A, 1B, 3, 4A, and 4B. For ease of description, the method 600 will be described as being performed by a traffic management system. This is not to be understood to limit the scope of the disclosure. Rather, any step or portion of the method 600 can be performed by any component or combination of components of the systems described herein.

The method 600 is configured to continually or intermittently shape user traffic to create a relatively uniform user experience. A uniform user experience can be where data rates are not significantly throttled at any point in time, rather modest adjustments are made continuously or intermittently to user data rates to ensure users do not exceed a plan data limit. This is in contrast to methods that enforce significant changes to user data rates after a data rate or data usage threshold has been exceeded. In some embodiments, the method 600 does not need to determine access link congestion levels but can adjust user data rates based on historical and current data usage rates. In various embodiments, the method 600 does not need to determine relative weighting factors for individual users but can use other mechanisms to ensure a desired uniform user experience. In certain implementations, specialty shapers are used to achieve manage data usage without the use of user-specific shaping based on relative weighting factors. The method 600 is effective in preventing or reducing the likelihood that an individual subscriber exceeds their plan data limit. Thus, the method 600 can advantageously be performed prior to an individual subscriber reaching their plan data limit.

In block 605, the traffic management system receives data usage feedback for a group of subscribers that share the same access network. The group of subscribers can be any subset of subscribers that share a common access network. In some embodiments, the group can be a group of subscribers with the same subscription plan. Other groups of subscribers can also be used such as, for example and without limitation, groups based on data usage rates, geography, subscription payments, or the like.

In block 610, the traffic management system updates past data usage rates for individual subscribers in the group. Past data usage rates can be determined using data usage feedback from user terminals or from a system that transmits user traffic to user terminals over an access link The data usage feedback can be from a designated time period that can be different from the designated time period used to determine the group data usage rates (e.g., a long-term period) or from a subset of the data usage feedback based on some criteria (e.g., congested periods of time).

In block 615, the traffic management system regulates (e.g., modifies, shapes, etc.) individual subscriber current data usage rates for one or more subscribers so that the data usage rate of the subscriber stays within a provisioning rate or an enforcement rate for the group, e.g., as discussed above. The enforcement rate for the group of subscribers can be based on a provisioning rate for that group. The enforcement rate can be the same as the provisioning rate or it can be larger or smaller than the provisioning rate.

The traffic management system can regulate data usage rates by shaping traffic bound for an individual subscriber's user terminal. Shaping can be performed by specialty shapers that operate on specific types of network traffic. Shaping may also be performed by user-specific shapers that adjust network traffic based at least in part on relative usage rates (e.g., relative weighting factors).

Terminology

As used herein, the term service provider includes but is not limited to an entity or system that provides subscription-based access, via an access network, to a target network such as the Internet. As used herein, the term user terminal (UT) includes but is not limited to subscriber equipment used to connect to the service provider through the access network. As used herein, the terms plan, subscriber plan, and subscription plan are used interchangeably and include but are not limited to one of multiple subscription types offered by the service provider. As used herein, the term plan period includes but is not limited to a reference time period during which a subscriber has paid for access to the access network. As an example, a subscriber's plan period may be 1 month, however, it should be understood that the plan period can be longer or shorter than 1 month, such as one or more weeks (e.g., 1 week, 2 weeks, 3 weeks, 4 weeks, 6 weeks, 8 weeks, etc.), one or more months (e.g., 2 months, 3 months, 4 months, 6 months, etc.), or one or more years (e.g., 1 year, 1.5 years, 2 years, etc.). As used herein, the term data usage includes but is not limited to the amount of data downloaded by a subscriber. As used herein, the term plan data limit includes but is not limited to the maximum data usage during a plan period allowed by a subscriber's plan. As used herein, the term plan usage rate includes but is not limited to the plan data limit divided by the plan period.

As used herein, the term long-term period includes but is not limited to a time period that is longer than a plan period. For example and without limitation, a long-term period can be a multiple of the plan period (e.g., 1.5×, 2×, 3×, 4×, etc.) or a set length of time (e.g., 60 days, 90 days, 91 days, 120 days, 3 months, 6 months, a year, etc.). As used herein, the long-term usage rate includes but is not limited to an average or weighted, normalized, or otherwise modified average of a subscriber's data usage over a long-term period. As used herein, the term short-term period includes but is not limited to a time period that is shorter than a plan period. For example and without limitation, a short-term period can be a fraction of the plan period (e.g., ¼×, ⅓×, ½×, etc.) or a set length of time (e.g., 5 days, 7 days, 10 days, 14 days, etc.). As used herein, the term short-term usage rate includes but is not limited to an average or weighted, normalized, or otherwise modified average of a subscriber's data usage over a short-term period. As used herein, the term data speed includes but is not limited to instantaneous download data throughput.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A traffic management system for managing data usage of a group of subscribers on a shared access network, the system comprising:
   one or more computer processors; and
   a data store configured to store computer executable instructions that, upon execution, cause the one or more computer processors to:
      receive data usage feedback for the group of subscribers;
      update, as the data usage feedback is received, a past data usage rate for individual subscribers, wherein the past data usage rate for the individual subscriber is based on the data usage feedback;
      regulate a current data usage rate for individual subscribers as needed so that the past data usage rate for the individual subscriber, as updated, is brought within an enforcement rate, wherein the enforcement rate corresponds to a per-subscriber allocation of a capacity of the access network.

2. The traffic management system of claim 1, wherein the past data usage rate for individual subscribers is based on the data usage feedback during a preceding first predetermined length of time.

3. The traffic management system of claim 2, wherein the past data usage rate for individual subscribers is based on the data usage feedback only during targeted periods of the first predetermined length of time.

4. The traffic management system of claim 2, wherein the past data usage rates for individual subscribers comprise an average or a weighted average data usage rate of the individual subscriber over the first predetermined length of time.

5. The traffic management system of claim 2, wherein the first predetermined length of time is greater than a plan period during which data usage of individual subscribers is limited to a predetermined limit.

6. The traffic management system of claim 2, wherein the first predetermined length of time is greater than or equal to sixty days.

7. The traffic management system of claim 3, wherein the targeted periods correspond to peak-busy times of the shared access network.

8. The traffic management system of claim 1, wherein regulating a current data usage rate for individual subscribers further comprises increasing an allowed data usage rate of an individual subscriber whose past data usage rate is less than the enforcement rate.

9. The traffic management system of claim 1, wherein regulating a current data usage rate for individual subscribers comprises determining weighting factors for the individual subscriber based at least in part on the past data usage rate of the corresponding individual subscriber.

10. The traffic management system of claim 9, wherein regulating a current data usage rate for individual subscribers comprises shaping network traffic intended for the individual subscriber based on the determined weighting factors for the corresponding individual subscriber.

11. The traffic management system of claim 1, wherein regulating a current data usage rate for individual subscribers comprises shaping network traffic to the individual subscriber using one or more specialty shapers.

12. The traffic management system of claim 1, wherein the group of subscribers comprises subscribers with a common subscriber plan.

13. The traffic management system of claim 1, wherein the shared access network comprises a spot beam of a satellite.

14. A method for managing data usage of a group of subscribers on a shared access network, the method comprising:
   receiving data usage feedback for the group of subscribers;
   updating, as the data usage feedback is received, a past data usage rate for individual subscribers, wherein the past data usage rate for the individual subscriber is based on the data usage feedback;
   regulating a current data usage rate for individual subscribers as needed so that the past data usage rate for the individual subscriber, as updated, is brought within an enforcement rate, wherein the enforcement rate corresponds to a per-subscriber allocation of a capacity of the access network.

15. The method of claim 14, wherein the past data usage rate for individual subscribers is based on the data usage feedback during a preceding first predetermined length of time.

16. The method of claim 15, wherein the past data usage rate for individual subscribers is based on the data usage feedback only during targeted periods of the first predetermined length of time.

17. The method of claim 15, wherein the first predetermined length of time is greater than a plan period during which data usage of individual subscribers is limited to a predetermined limit.

18. The method of claim 15, wherein the first predetermined length of time is greater than or equal to sixty days.

19. The method of claim 16, wherein the targeted periods correspond to peak-busy times of the shared access network.

20. The method of claim 14, wherein regulating a current data usage rate for individual subscribers further comprises increasing an allowed data usage rate of an individual subscriber whose past data usage rate is less than the enforcement rate.

21. The method of claim 14, wherein the past data usage rates for individual subscribers comprise an average or a weighted average data usage rate of the individual subscriber over the first predetermined length of time.

22. The method of claim 14, wherein regulating a current data usage rate for individual subscribers comprises determining weighting factors for the individual subscriber based at least in part on the past data usage rate of the corresponding individual subscriber.

23. The method of claim 22, wherein regulating a current data usage rate for individual subscribers comprises shaping network traffic intended for the individual subscriber based on the determined weighting factors for the corresponding individual subscriber.

24. The method of claim 14, wherein regulating a current data usage rate for individual subscribers comprises shaping network traffic to the individual subscriber using one or more specialty shapers.

25. The method of claim 14, wherein the group of subscribers comprises subscribers with a common subscriber plan.

26. The method of claim 14, wherein the shared access network comprises a spot beam of a satellite.

* * * * *